United States Patent Office 3,212,372
Patented Oct. 19, 1965

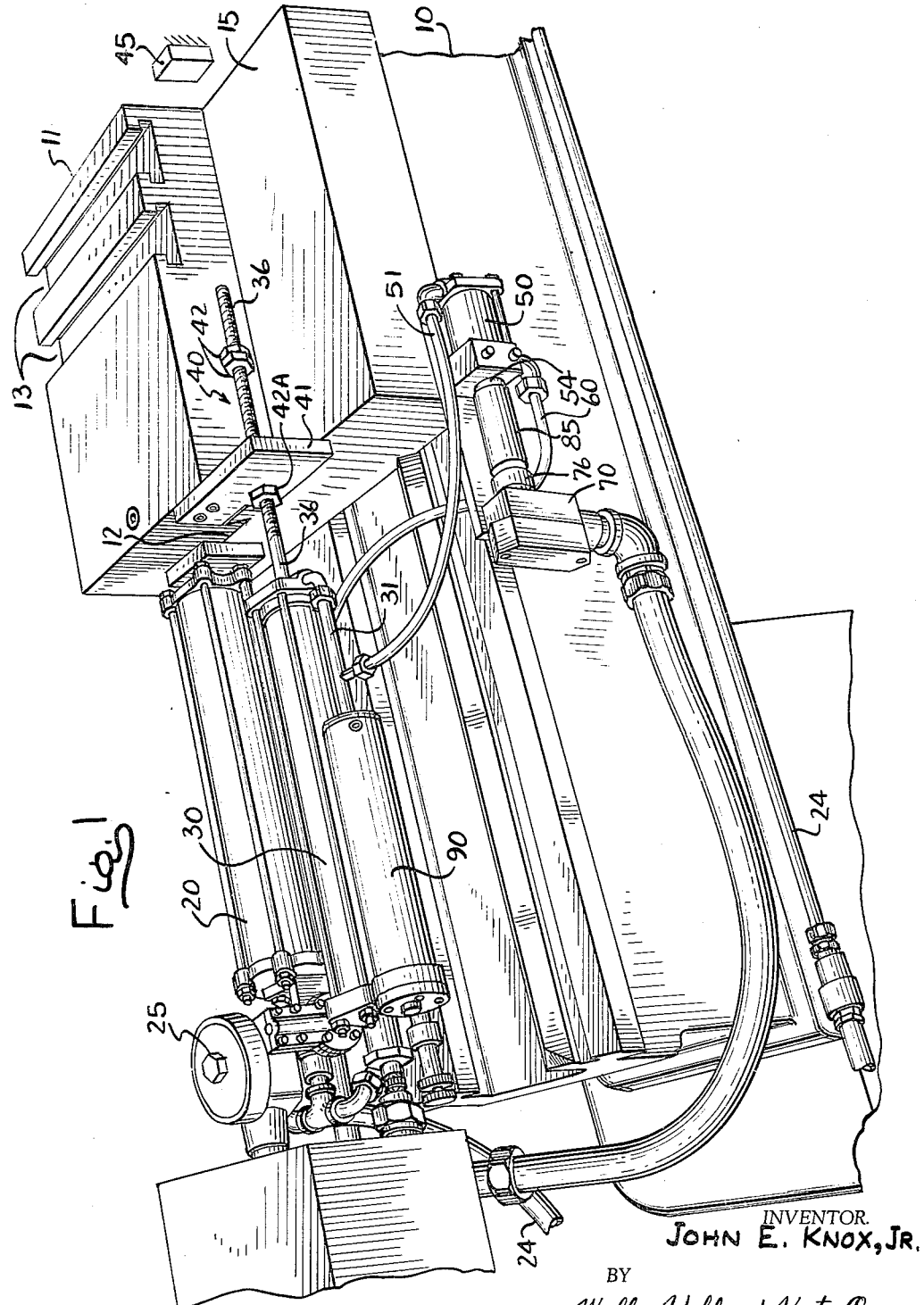

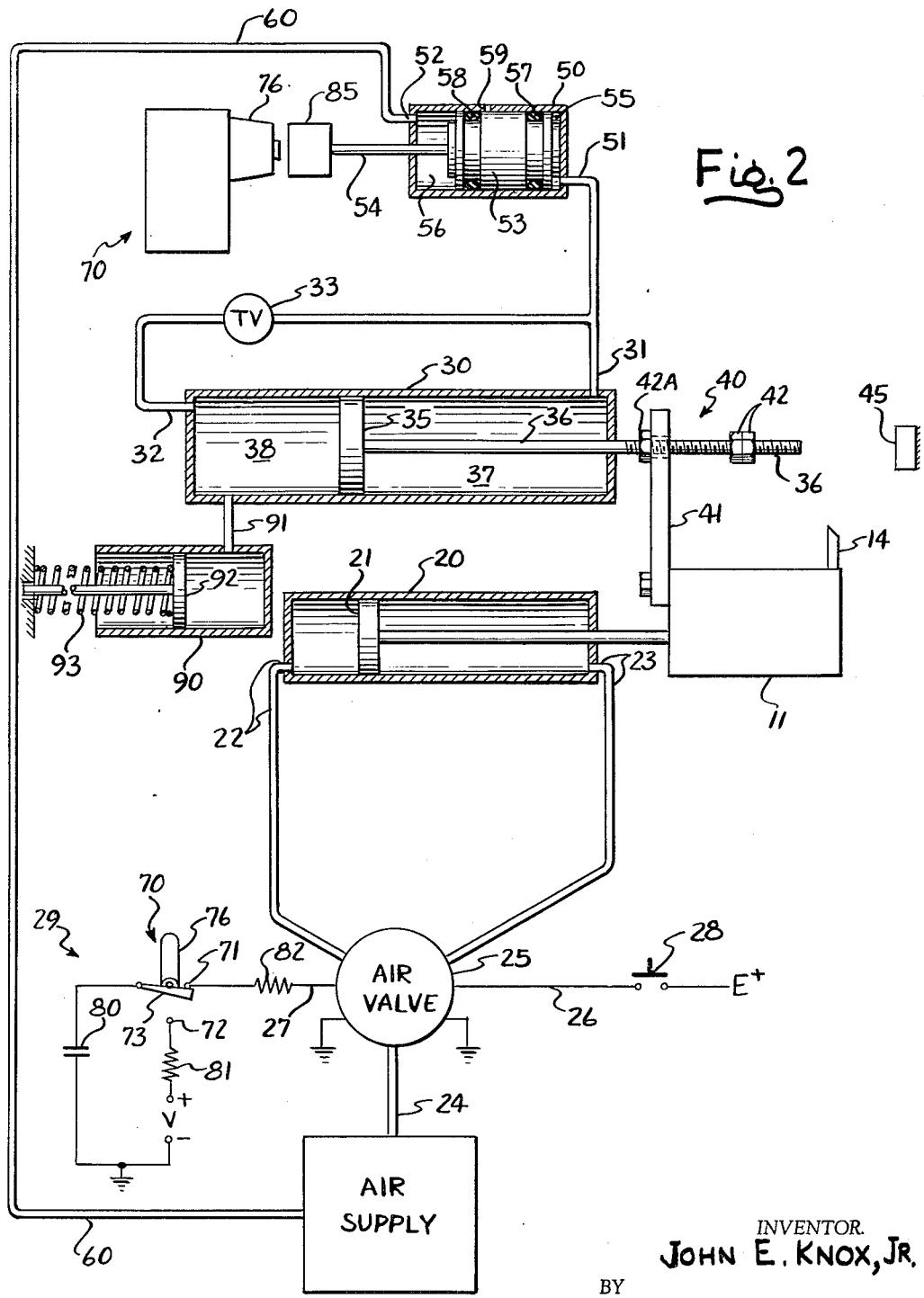

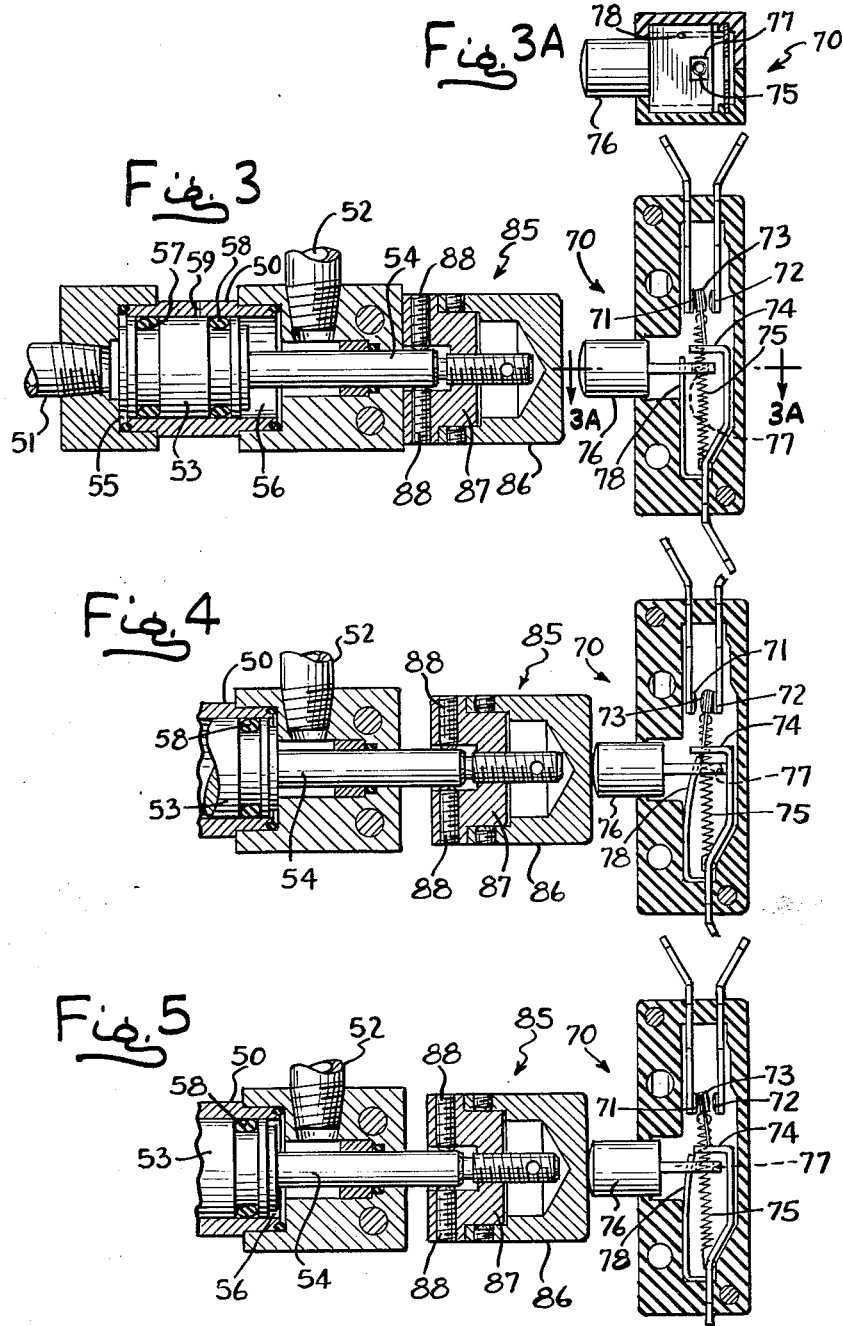

3,212,372
FEED AND DWELL SYSTEM
John E. Knox, Jr., Rolling Meadows, Ill., assignor to Sheldon Machine Company, Inc., Chicago, Ill., a corporation of Illinois
Filed Nov. 21, 1962, Ser. No. 239,168
2 Claims. (Cl. 82—21)

The present invention relates to machine tools and more particularly to means for establishing a time delay or dwell at the completion of a cut or other operation.

It is an object of the present invention to provide an improved control arrangement for a machine tool, and more particularly a metal turning lathe, such that the tool remains or "dwells" at the end of a cut for a short interval prior to returning to the starting position thereby cleaning up the cut and providing a smooth finish free of burrs or the like.

It is another object of the invention to provide an improved dwell control system for a machine tool which produces an accurate and consistent time delay which may be easily adjusted depending upon the length of dwell desired. In this connection it is an object to provide a dwell control arrangement which is positive in operation, which is actuated upon engagement of a positive stop included in the system, and which provides the same amount of dwell regardless of the rate of feed or traverse of the tool relative to the workpiece.

Further, it is an object of this invention to provide fail-safe means for causing the tool carriage to return to the starting position when an obstruction, such as a broken tool, prevents forward movement of the tool carriage, as contrasted to present devices wherein the tool carriage must complete its intended movement before the carriage is caused to return.

It is still another object of the invention to provide a dwell control system which has an extremely long life and in which the dwell period is maintained precisely constant at an adjusted value over many thousands of operations. Thus, it is an object of the invention to provide a dwell system which is particularly suitable for use with automatic machine tools, such as turret lathes, which are sometimes operated at capacity on a single setup for weeks or months at a time. In this connection it is an object to provide a dwell arrangement which does not require constant care or attention but in which maintenance is reduced to an absolute minimum.

It is yet another object of the present invention to provide a dwell system for a machine tool or the like which utilizes existing elements of the feed control mechanism and which brings about a new function by addition of a few inexpensive, non-critical components integrated in a novel way with the existing control system. Consequently, it is an object to provide a dwell system which may be added at low cost to lathes and other machine tools already in the field for the purpose of bringing them up to date.

Other objects and advantages of the invention will become apparent upon reading the attached detailed discussion and upon reference to the drawings in which:

FIGURE 1 is a general perspective of a portion of a lathe incorporating the dwell system of the present invention.

FIG. 2 is a diagram showing the dwell system with a portion of the parts shown symbolically and for the purpose of readily understanding the present invention.

FIG. 3 shows a switch-actuating plunger and the associated switch with interposed adjusting means for adjusting the amount of dwell, the parts being shown prior to engagement of the switch.

FIG. 3A is a transverse sectional view taken along the line 3A—3A of the switch in FIG. 3.

FIG. 4 is a fragmentary stop motion view showing the actuator at the end of its stroke and with the switch fully cocked.

FIG. 5 is a stop motion view similar to FIG. 4 but showing the plunger of the actuator moving in the return direction and with the switch at the operating point thereby to determine the end of the dwell period.

While the invention has been disclosed in connection with a preferred embodiment, it will be understood that I do not intend to be limited to the embodiment shown but intend to cover the various alternative and equivalent constructions included within the spirit and scope of the appended claims.

Turning now to FIGS. 1 and 2, there is shown, in FIG. 1, a lathe having a frame or bed 10 mounting a tool slide 11 which is slidable endwise on the machine slide base 15 upon longitudinal ways 12. The tool slide includes a tool mount in the form of T slots 13 to which a suitable tool 14 may be clamped. It will be understood that the invention is not limited to use with any particular type of tool and is applicable wherever a predetermined amount of delay time or dwell plus accurate stop or depth is required at the end of the feed stroke.

For the purpose of reciprocating the tool slide 11, a drive cylinder 20 is provided having a plunger 21 which is connected to the tool slide and having air inlets 22, 23 at its opposite ends connected to receive air from a supply line 24 via an air valve 25 to control the direction of movement. The air valve 25 is of the well-known detented type having "forward" and "reverse" electrical input leads 26, 27 and capable of remaining in one condition or the other following momentary electrical energization. To energize the air valve for forward driving of the air cylinder a start pushbutton 28 may, for example, be provided. To effect reversal, a reversing circuit generally indicated as 29 is used as will be covered in detail in a following paragraph. It will be understood that the reversing circuit 29 has been greatly simplified for ready understanding and normally forms only a portion of a more involved control arrangement.

For the purpose of controlling the rate of feed of the tool slide 11 with respect to the workpiece under the urging of the air cylinder 20, a hydraulic checking cylinder 30 is interposed between the frame and the tool slide. Such hydraulic checking cylinder referred to in commercial practice as a "Hydrocheck" includes a throttling valve to control the rate of escape of the fluid thereby to build up a back pressure which limits the rate of feed depending upon the setting of the valve. Thus the checking cylinder 30 is the present instance is in the form of a double acting hydraulic cylinder having a first hydraulic connection 31 at its forward end and a second hydraulic connection 32 at its rear end interconnected by a throttling valve 33. Internally, a piston 35, which has a piston rod or plunger 36, serves to define a first or forward chamber 37 and a rear chamber 38.

In carrying out the invention, the tool slide 11 and the plunger 36 have a lost motion connection between them so that the slide may advance rapidly under the urging of the air cylinder 20 until the tool 14 is in the vicinity of the workpiece, following which a direct connection exists between the checking cylinder and the slide opposing the further movement of the slide and thereby limiting the rate of feed of the tool to a predetermined value. In the present instance this lost motion connection, indicated generally at 40, is brought about by slidably receiving the plunger 36 of the checking cylinder in a bracket 41 secured to the tool slide 11 and by providing, in the path of movement of the bracket, an adjustable stop 42. The stop 42 may, for example, be in the form of a pair of nuts threaded on the plunger 36 and jammed together at a predetermined position. It will be apparent, then, that the tool slides may move rapidly and unobstructedly up to the point where the bracket 41 bottoms on the stop 42, following which any further movement of the tool slide is inhibited by the action of the checking cylinder 30.

For the purpose of limiting the stroke of the tool slide 11 and the associated plunger 36 of the checking cylinder, a limit stop is provided on the frame of the machine. In the present instance, this limit stop, indicated at 45, is mounted in the path of movement of the plunger 36 of the checking cylinder. The stop is preferably micro-adjustable so that the end of the stroke of the tool slide may be set, with a high degree of precision, by the operator of the machine.

In accordance with the present invention, means are provided which are responsive to the buildup of back pressure in the checking cylinder, and the subsequent substantial drop-off of the back pressure, for reversing the position of the valve 25 which controls the air cylinder thereby to produce retraction of the tool slide. More specifically in accordance with the present invention, a switch is provided for reversing the valve 25 together with means for conditioning the switch for operation, or cocking it, when the back pressure rises and for effecting operation after a short time delay interval when the pressure falls at the end of the stroke of the slide upon bottoming of the slide with respect to the adjustable stop. Thus, there is provided a switch and auxiliary actuator, with the actuator being in communication with, and responsive to, the back pressure which exists in the forward chamber 37 of the checking cylinder. Turning attention to the switch actuator indicated at 50, and which is shown in cross section in FIG. 3, it will be noted that it is in the form of a cylinder having connections 51, 52 at its opposite ends and having a piston 53 secured to a switch operating plunger 54. The piston 53 separates the internal space into a first chamber 55 and a second chamber 56. To insure against leakage between the chambers, the piston carries a double set of O rings 57, 58, which, in all positions of the piston, straddle a leakage vent 59 bored in the wall of the cylinder.

In accordance with one of the aspects of the invention means are provided for biasing the plunger 54 in one direction so that, when back pressure is applied from the checking cylinder, the piston moves against the force of bias to condition the associated switch for reversal and so that, when the back pressure is substantially reduced, the plunger is moved in the opposite or return direction under the force of bias for actuating the switch thereby to produce reversal of the tool slide 11. In the present instance, the bias is provided by applying air at constant pressure through a line 60 which is connected to the connection 52 on the actuator 50. To understand how the switch, indicated at 70, is first "conditioned" and subsequently actuated for reversal of the air valve 25, reference is made to the internal construction of the switch shown in FIGS. 3 and 3A. Here it will be noted that the switch is of the single pole double throw type, having a first contact 71, a second contact 72 and a movable contact, or central switch blade, 73 between them. The switch is preferably of the snap action type, with the switch blade 73 having a knife edge pivoted on a support 74 and having an overcenter spring 75 which detents the central contact in its alternate, contact-making positions. For the purpose of "throwing" the main switch, a pushbutton plunger 76 is provided which is coupled to the overcenter spring for the purpose of moving the spring to one side or the other of its dead center position. In the present instance this coupling is achieved by forming an opening 77 in the lower hand portion of the plunger. To maintain the pushbutton 76 in its normally extended position thereby to establish normal contact between the contacts 71, 73, a return spring 78 is provided which may be in the form of a simple loop of spring wire seated with respect to the switch housing and the tip of which engages the body of the pushbutton.

In carrying out the present invention, the switching of the valve 25 for reverse movement is "conditioned" by charging of a capacitor through the fixed contact 72 of the switch when the plunger of the switch actuator moves in response to the back pressure. The capacitor is discharged by the making of contact 71 during the subsequent return movement of the auxiliary actuator 50, under the force of bias, after the tool slide strikes the microadjustable stop 45 which defines the end of its stroke. Thus, referring to FIG. 2, a capacitor 80 is connected to the central blade 73 of the switch, the normally closed contact 71 is connected to the reversing line 27 of the air valve, and the remaining contact 72 is connected to a suitable source of direct voltage, designated as V. Inrush and out-rush current of the capacitor are limited by series resistors 81, 82 respectively. Under normal conditions, with the switch plunger extended (see FIG. 3), contact 71 is made connecting the capacitor 80 in circuit, but the capacitor, under such conditions, is uncharged and has no continuing effect. However, when the actuator 50 responds to the back pressure in the checking cylinder, the plunger 54 thereof, moving to the right against the force of bias in FIG. 3 (to the left in FIGS. 1 and 2) presses the switch to the point where the switch blade snaps over into engagement with the contact 72 thereby charging the capacitor 80 from the voltage source. The plunger 54 then continues its movement into an overtravel region until it bottoms in the actuator. It is one of the features of the present invention, however, that the overtravel or lost motion within the switch 70, which is particularly characteristic of snap action switches of the present type, is usefully employed to define a time delay interval between the time at which the plunger begins its return movement (which occurs when the slide strikes its stop) and the time at which the contact 71 is reclosed to produce discharge of the capacitor 80 into the electrically operated valve 25 to trigger reverse movement of the slide. Since in the present switch, the switch plunger or pushbutton may be depressed far beyond the point where the contact 71 will be closed upon eventual release, it will be apparent that a wide range of overtravel is available to provide a relatively wide range of dwell.

For the purpose of varying the amount of dwell, means are provided for varying the amount of "excess" inward movement of the switch pushbutton which occurs up to the time of bottoming in the actuator 50. This is accomplished in the present instance by varying the effective length of the plunger 54 of the switch actuator. Referring to FIG. 3 which shows the construction of the actuator in some detail, it will be noted that the plunger 54 does not engage the switch directly. Instead, the end of the plunger 54 is threaded and carries an adjustable head 85 which is of hollow composite construction including a head piece or tip 86 secured to a tapped base or nut 87. The latter is fitted with set screws 88 which serve to lock the head in adjusted position.

Prior to describing a typical cycle of operation it may be noted that means are provided for providing make-up oil for the hydraulic checking cylinder 30 and for accommodating the fluid which is displaced from the switch actuator during the return movementt of the plunger. Thus, I provide an accumulator 90 having a hydraulic connection 91 with the rear chamber 38 of the checking cylinder and having a piston 92 which is biased inwardly by a spring 93 or the like. It will thus be apparent that when a slide comes to rest at the forward end of its stroke dropping the back pressure in the checking cylinder to a low value, the bias force in the actuator 50, moving the piston 53 to the right in FIGS. 1 and 2 (to the left in FIGS. 3–5), produces discharge of the fluid through the throttle valve 33 and into the chamber 38 of the checking cylinder. Since this chamber is, at all times, completely filled with fluid, an amount of fluid equal to that which is entering, is discharged through the connecting line 91 and into the accumulator 90. This is accompanied by retreating movement of the piston 92 in the accumulator against the biasing force provided by the spring 93. It will be apparent that to produce this desired flow of fluid the pressure exerted by the force of bias in the switch actuator 50 must exceed the pressure brought about by the force of bias in the accumulator 90; in other words, the spring 93 of the accumulator should be sufficiently light as to insure a relatively light pressure drop across the throttling valve 33. While compressed air is employed as the force of bias in the switch actuator 50, it will be apparent that a spring capable of exerting a strong force, but having a low spring rate, may be used.

In the present construction, the same adjustable throttle valve 33 is employed to set the feed rate of the slide and to conduct the displaced fluid from the switch actuator during the switch operating portion of the cycle. One advantage of this is that it provides for a limited amount of coordination between the feed rate and the dwell time. However, the main adjustment of the dwell time is that which is brought about by adjusting the head 85 with respect to the plunger 54 on which it is mounted.

While the operation of the device will be apparent to one skilled in the art in view of the above description, it will be helpful to describe a typical cycle of operation with respect to the stop motion views in FIGS. 3, 4 and 5. With the parts as shown in FIGS. 2 and 3, air pressure is applied and the start button 28 is pressed causing the valve 25 to apply pressure to the left hand side of the piston of the air actuator 20 (see FIG. 2). This causes the tool slide 11 to rapidly approach the work until the bracket 41 on the tool slide strikes the stop 42 on the plunger of the checking cylinder 30. When this occurs the hydraulic fluid trapped on the right hand side of the piston in the checking cylinder (see FIG. 2) interposes a reaction force, thus slowing the tool slide down to a desired feed rate. The back pressure, and hence the feed rate, is determined by the degree of throttling for which the throttle valve 33 has been previously adjusted.

In addition to slowing down the slide, the back pressure from the checking cylinder is applied to the switch actuator through the line 51, causing the plunger 54 of the actuator to move to the right in FIG. 3 (to the left in FIG. 2) promptly against the biasing force of the air pressure until bottoming occurs. During the course of such movement contact 71 in the switch is opened and contact 72 is snapped closed, thus charging the capacitor 80. The switch button is, however, pressed beyond the point where the switching occurs and into its range of overtravel as shown in FIG. 4. The amount of switch overtravel which is utilized is dependent upon the effective length of the plunger 54, i.e., upon the adjustment of the head 85 of the plunger. The switch, under such conditions, may be considered as "conditioned" or "cocked" for further actuation.

Movement of the tool slide 11 and the plunger of the checking cylinder 12 continues, completing the cut and until such time as the end of the plunger 36 engages the adjustable limit stop 45. Since the tool slide and plunger of the checking cylinder are both blocked against further movement, there is no further need for fluid to escape from the checking cylinder and therefore no back pressure brought about by throttling of fluid through the throttle valve. Consequently, the pressure applied to the switch actuator 50 is drastically reduced, to the point where the force of bias provided by the compressed air at the righthand side of the actuator in FIGS. 3–5 (left hand side in FIG. 2) is capable of overcoming the fluid pressure in the opposite side of the actuator so that the plunger 54 moves to the left in FIGS. 3–5 (to the right in FIG. 2). Such movement, however, requires displacement of fluid from the switch actuator, which fluid must flow through the line 51 and throttling valve 33 into the rear or right hand end of the checking cylinder (see FIG. 2) and with an equivalent amount of fluid being displaced into the accumulator 90. Because of the throttling of the escaping fluid, through a constant orifice and with a constant value of air pressure applied, it will be apparent to one skilled in the art that the plunger of the switch actuator will move at a predetermined rate to the left in FIGS. 3–5 (to the right in FIG. 2) with followup action of the switch pushbutton. This movement continues over a short but accurately defined period of time until all of the lost motion has been taken up, i.e., until the condition shown in FIG. 5 is reached. During the interval between FIGS. 4 and 5 the tool slide 11 simply remains stationary at the end of its stroke. Such intentional dwell maintains the tool in contact with the work thereby cleaning up the cut and providing a smooth finish free of burrs or the like.

When the switch actuator reaches the condition illustrated in FIG. 5, the switch blade snaps from its contact 72 back to its contact 71 so that the charge stored in the capacitor 80 is discharged into the reversing line 27 of the air valve 25. This produces prompt reversal of the condition of the valve, applying air to the forward or right hand end of the air cylinder 20 (see FIG. 2), and retracting the tool slide 11 back to its initial or starting position. For the purpose of restoring the checking cylinder to a condition of readiness for a subsequent cycle, a second or "retract" stop 42a is provided on the plunger 36. Such stop is engaged by the bracket 41 during the course of the return movement of the slide. Any suitable stop may be provided to limit the retracting movement of the slide and to establish the starting position.

While the operation has been described in connection with an intended cycle of operation which utilizes the positive stop 45 to determine the end of the cut, it is one of the features of the present construction that retraction of the tool slide 11 is caused to occur automatically in the event that its forward movement is obstructed for any reason whatsoever. This might occur, for example, by reason of some foreign object falling in the path of the tool slide or may occur under certain conditions of tool breakage. In any event, blockage of the movement of the tool slide and its associated checking cylinder at any point along their path of movement stops the flow of displaced fluid in the checking cylinder and produces a sharp drop in the back pressure. This sharp drop is interpreted by the actuator and switch the same as an intentional obstruction by the limit stop, i.e., reverse movement of the actuator plunger 54 occurs, accompanied by switching of the switch 70 for discharge of the capacitor through the valve control line, thereby bringing about a reversal in the direction of the air pressure applied to the air cylinder and retraction of the tool slide. This is to be contrasted with conventional arrangements in which the tool slide must complete its intended stroke before any reversal can occur and when accidental obstruction might cause damage or injury.

It is one of the primary features of the present construction that switching is much more prompt and precise than in conventional practice. Thus, instead of actuating a switch by movement of the slide directly, the switch is, instead, made responsive to a pressure condition, i.e., back pressure which is dependent only upon movement or lack of movement of the slide and not upon gradations in the slide position. In short, the switch remains completely unaffected, as far as its reversing function is concerned, until the tool slide has actually come in contact with its adjustable stop 45. Moreover, the point at which stoppage of the slide, dwell, and reversal takes place is not dependent upon the speed of the approach so that there is no "speed error" as in conventional limit stop arrangements. When the stop is engaged, the biasing air pressure available in the line 60 is triggered to produce controlled retraction of the plunger 54 and causing the switch to undergo the return portion of the switching cycle, i.e., the taking up of the lost motion followed by switching of the capacitor into the valve circuit. Thus, a degree of accuracy of positioning is achieved which exceeds that obtainable with ordinary use of limit switches without necessity for employing expensive and highly accurate switches. Any ordinary single pole-double throw switch of the "microswitch" type may be used. Moreover, the switch actuator 50 which operates the switch may be of small size and capable of low cost manufacture. Consequently it will be apparent to one skilled in the art that the features of the present invention may be added at low cost to existing designs of lathes and other machine tools, even those already installed in the field.

While the invention has been described in connection with a machine tool, specifically a lathe, it will be understood by one skilled in the art that the invention is not necessarily limited thereto and may be employed whereever a moving member is required to be stopped at a predetermined position along its path of movement and to retract therefrom following a predetermined dwell interval.

In the following claims the term "slide" shall be understood to mean any machine element or the like which it is desired to move and accurately position. The term "checking cylinder" shall be deemed to cover any means for inhibiting slide movement by development of a back pressure by reason of displaced fluid and regardless of the geometric shape of the device.

I claim as my invention:

1. In a feed and dwell system for a machine tool or the like, the combination comprising a frame, a slide on said frame, an air actuator having a control valve for reciprocating the slide for forward and reverse movement, a positive stop for said slide, a hydraulic checking cylinder interposed between the frame and the slide having a hydraulic connection and so constructed and arranged that a fluid back pressure is produced at said hydraulic connection during forward movement of the slide thereby to limit the feed rate of the slide to a desired value, a switch for controlling the air actuator control valve for reversing movement of the slide, said switch being of the single pole double throw type having first and second contacts and a central contact, a capacitor connected to said central contact and said first and second contacts being connected to a source of voltage and to said air valve respectively, and an auxiliary actuator for said switch having a biased plunger and communicating with the hydraulic connection on the checking cylinder so that upon increase in back pressure resulting from forward movement of a slide the plunger moves toward a bottomed position accompanied by making of the first contact for charging of said capacitor and so that upon decrease in back pressure upon said slide stopping the plunger moves in the return direction accompanied by making of the second contact thereby actuating said air valve to produce reverse movement of the slide to starting position.

2. In a feed and dwell system for a machine tool or the like, the combination comprising a frame, a slide on said frame, an air actuator having a control valve for reciprocating the slide for forward and reverse movement, a positive stop for said slide, a hydraulic checking cylinder interposed between the frame and the slide having a hydraulic connection and so constructed and arranged that a fluid back pressure is produced at said hydraulic connection during forward movement of the slide thereby to limit the feed rate of the slide to a desired value, a switch for controlling the air actuator control valve for reversing movement of the slide, said switch being of the single pole double throw type having first and second contacts and a central contact, a capacitor connected to said central contact and said first and second contacts being connected to a source of voltage and to said air valve respectively, an auxiliary actuator for said switch having a biased plunger and communicating with the hydraulic connection on the checking cylinder so that upon increase in back pressure resulting from forward movement of a slide the plunger moves toward a bottomed position accompanied by making of the first contact for charging of said capacitor and so that upon decrease in back pressure upon said slide stopping the plunger moves in the return direction accompanied by making of the second contact thereby actuating said air valve to produce reverse movement of the slide to starting position, and means for changing the effective length of the plunger so that the making of said second contact is delayed until the plunger thereof moves a predetermined distance in the return direction thereby to establish predetermined dwell of the slide at the end of its stroke.

References Cited by the Examiner
UNITED STATES PATENTS

| | | | |
|---|---|---|---|
| 2,030,335 | 2/36 | Svenson | 82—2 |
| 2,442,868 | 6/48 | Dare. | |
| 2,806,912 | 9/57 | Pearson et al. | 200—47 |
| 2,817,725 | 12/57 | Rochfort et al. | 200—47 |
| 2,878,693 | 3/59 | Carlstedt | 77—32.7 X |
| 2,893,272 | 7/59 | Linsker | 77—32.7 X |
| 2,954,851 | 10/60 | Klancnik | 188—97 |
| 2,986,957 | 6/61 | Klancnik | 77—32.5 |
| 3,043,278 | 7/62 | Ackerman. | |

WILLIAM W. DYER, Jr., *Primary Examiner.*